United States Patent
Kanao et al.

[11] Patent Number: 5,769,127
[45] Date of Patent: Jun. 23, 1998

[54] RESIN PIPE

[76] Inventors: Shiro Kanao, deceased, late of Osaka, Japan; by Chizuko Kanao, heir, 9-18, Nanpeidai 4-chome, Takatsuki-shi, Osaka; by Shigeki Kanao, heir, 2-40, Minami-machi, Jurinji, Nishinomiya-shi, Osaka, both of Japan

[21] Appl. No.: 506,601

[22] Filed: Jul. 25, 1995

[30] Foreign Application Priority Data

Jul. 25, 1994 [JP] Japan .................................... 6-193514

[51] Int. Cl.⁶ .................................................... F16L 11/24
[52] U.S. Cl. ......................... 138/129; 138/137; 138/147; 138/150; 138/154
[58] Field of Search .................................... 138/129, 120, 138/130, 137, 147, 150, 154, 155

[56] References Cited

U.S. PATENT DOCUMENTS

| | | | |
|---|---|---|---|
| 3,495,628 | 2/1970 | Boender | 138/154 |
| 4,209,043 | 6/1980 | Menzel | 138/129 |
| 4,531,551 | 7/1985 | Eichelberger et al. | 138/129 |
| 4,869,295 | 9/1989 | Keldany | 138/129 |
| 4,903,736 | 2/1990 | Baston et al. | 138/129 |
| 5,007,462 | 4/1991 | Kanao | 138/154 |
| 5,390,704 | 2/1995 | Kanao | 138/154 |

*Primary Examiner*—Denise L. Ferensic
*Assistant Examiner*—James F. Hook
*Attorney, Agent, or Firm*—Whitham, Curtis & Whitham

[57] ABSTRACT

A pipe wall has an inner wall cylindrically formed of a soft material of rubber, synthetic rubber or synthetic resin, a rising rib bonded at its base portion onto an outer circumferential surface of the inner wall so as to extend therefrom in an outer circumferential direction, and an outer wall coupled at its base end portion with the rising rib so as to extend in an axial direction of the pipe in a position separated at a predetermined distance circumferentially from the inner wall, the rib and the outer wall being formed of a hard synthetic resin material and wound spirally, wherein only a top end portion of the outer wall is coupled with a preceding winding of the outer wall, and separable dividing portion is formed between the top end portion and the base end portion.

14 Claims, 6 Drawing Sheets

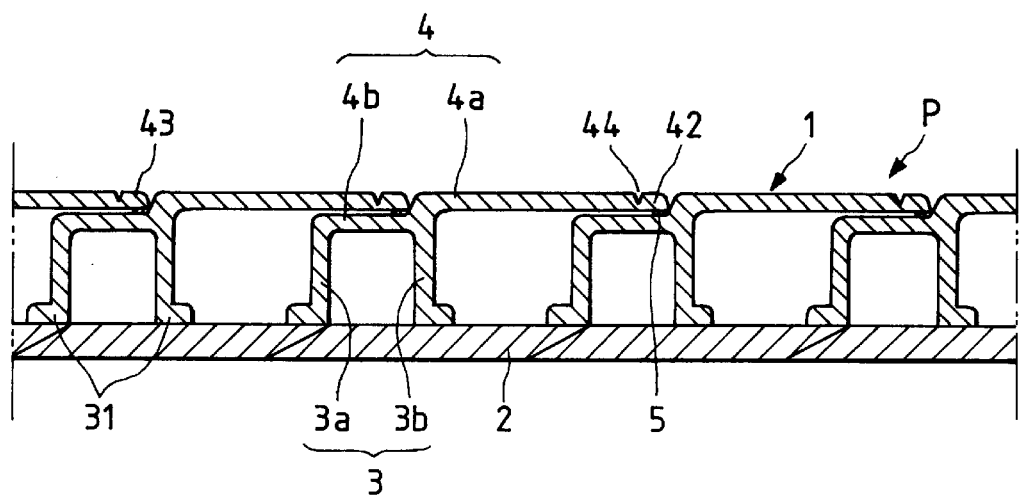
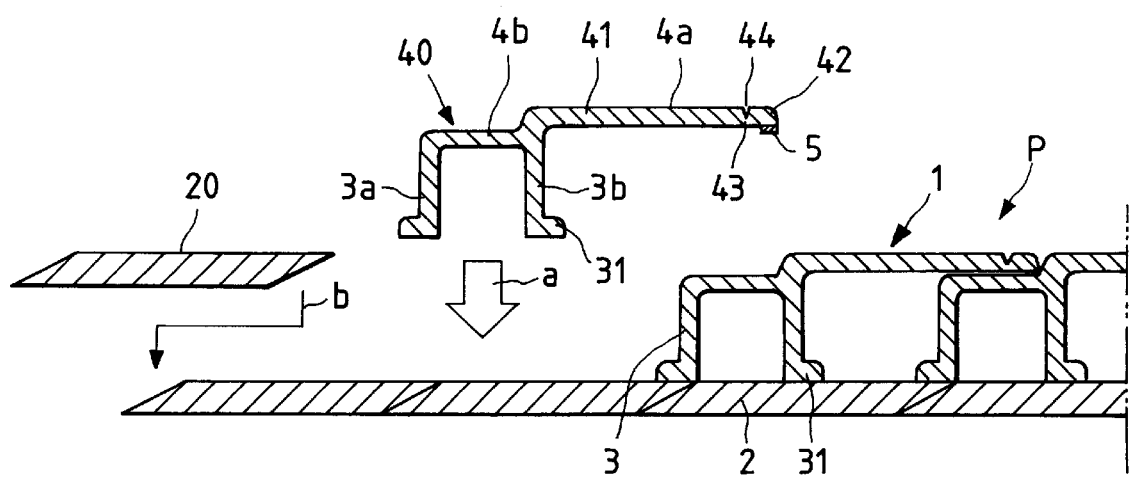

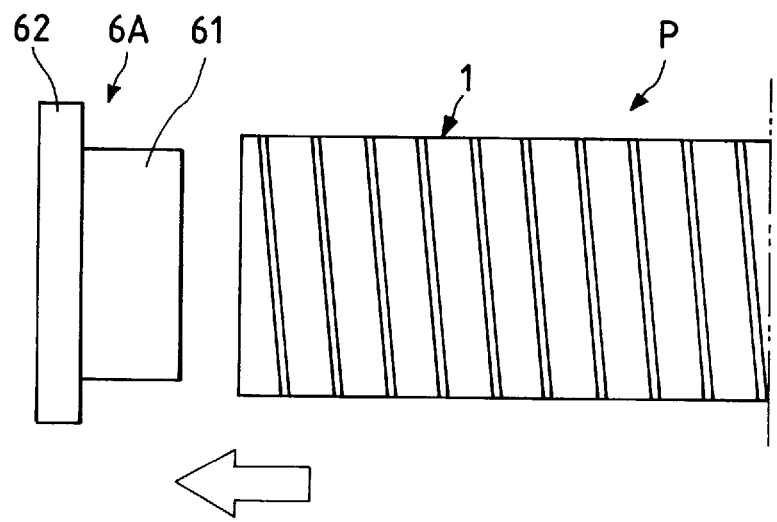
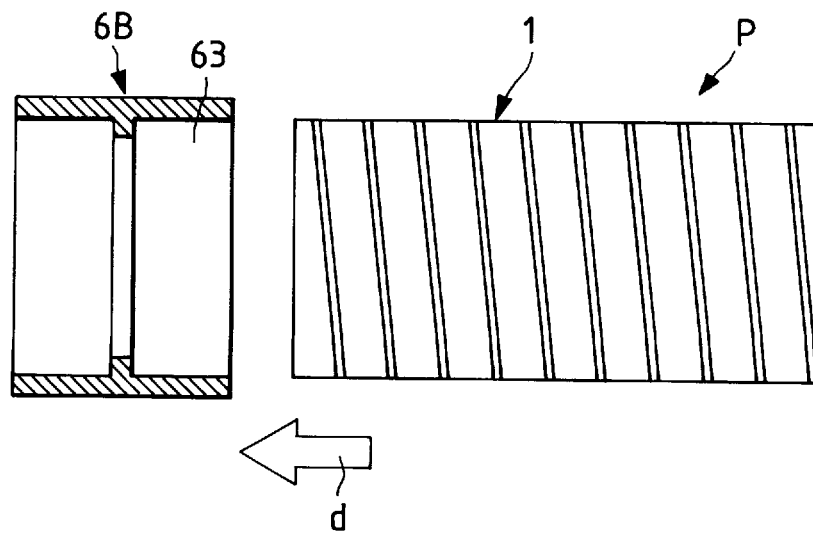

RESIN PIPE

BACKGROUND OF THE INVENTION

The present invention relates to a resin pipe formed of a material such as rubber, synthetic rubber or synthetic resin (hereinafter this pipe is generically referred to as "a synthetic resin pipe" for the sake of convenience). Particularly, the invention relates to a synthetic resin pipe which can be bent and subjected to plumbing desirably with a required bending angle in a necessary place while the synthetic resin pipe is a pipe which maintains the state of a straight pipe in a normal posture.

As for conventional synthetic resin pipes, there are generally a straight pipe formed of a hard material, and a flexible pipe formed of a soft material. Such pipes have been used in any place, and known so well that it is not necessary to give reference by way of example.

However, a straight pipe made of a hard material has problems in that much labor and time are required to out the pipe in a bent portion and connect the pipe to another pipe through a bent plumbing pipe joint such as an elbow whenever bent plumbing is carried out in plumbing, and in that it is difficult to carry out plumbing at a desired inclination angle. On the other hand, a flexible pipe formed of a soft material has an advantage that it is possible to perform bent plumbing at a desired inclination angle in a desired place without using any pipe joints in a bent portion. However, when plumbing is carried out in a horizontal or inclination direction, the pipe sags between metal fittings supporting or suspending the pipe because of the flexibility of the pipe itself. Accordingly, there are problems not only in that it is difficult to carry out plumbing with the pipe straight, but also in that the sagging between the metal fittings becomes large as time goes so that mud, sand and other sediments are heaped up in the sagging portion, and at last water is blocked from flowing. Therefore, such a flexible pipe is not suitable for plumbing in the horizontal direction or the like.

SUMMARY OF THE INVENTION

Taking into consideration the foregoing problems belonging to a straight hard pipe and a soft flexible pipe, and making the best use of advantages belonging to these conventional pipes, the present invention provides a synthetic resin pipe by which the problems belonging to these conventional pipes can be solved. That is, the present invention has an object to provide a synthetic resin pipe which can keep a straight posture normally, keep such a straight posture without natural sagging in a portion requiring straight plumbing including horizontal plumbing, and be subjected to plumbing with a desired bent posture at a required bending angle in a desired portion when bent plumbing is required.

To attain the foregoing object and solve the foregoing problems, a synthetic resin pipe according to the present invention is designed so that a pipe wall has an inner wall cylindrically formed of a soft material of rubber, synthetic rubber or synthetic resin, a rising rib formed of a hard synthetic resin material and bonded at its base portion onto an outer circumferential surface of the inner wall so as to extend in an outer circumferential direction, and an outer wall formed of the hard synthetic resin material and coupled at its base end portion with the rising rib so as to extend in a axial direction of the pipe in a position separated at a predetermined distance circumferentially from the inner wall, the rib and the outer wall being wound spirally, wherein only a top end portion of the outer wall is coupled with a preceding winding of the outer wall, and a separable dividing portion is formed between the top end portion and the base end portion.

The synthetic resin pipe according to the present invention can be realized by conditions that the inner wall and the outer wall are formed into approximately flat cylinders; that the rising rib and the outer wall are formed integrally; that the sets of the rising rib and the outer wall are formed as separate bodies and the base end portion of the outer wall is fixed onto the rib to integrate the sets; that means for coupling the top end portion of the outer wall is realized by bonding or fitting connection; that means for forming the inner wall is realized by a tube-like extruding cylinder; that belt-like materials are wound spirally and connected; and so on.

As for the material forming the rising rib and the outer wall, the hardness, thickness, height and width are established desirably taking the size of pipe diameter and the pressure resistance into consideration, and polyvinyl chloride resin (PVC), polyethylene resin, polypropylene resin, or any other desired synthetic resin is selected and used as the forming material. In order to protect the inner wall formed of a soft material from being broken by an external force, preferably the outer wall is formed and established so as to cover and hide the inner wall in the outside of its bent posture in a bent portion (on the side of large diameter of a bent portion). In the case of a pipe to let high-pressure fluid pass through or to let substances such as mud and sand, or the like, having a large friction pass through, in order to increase the inner pressure resistance or abrasion resistance of the inner wall, it is possible to reinforce the pipe by using fibrous substances, cloth or the like which do not spoil the flexibility.

In a synthetic resin pipe having such a structure according to the present invention, a rising rib exists on the outer circumference of the inner wall, and only a top end portion of the outer wall coupled with this rib is coupled with a preceding winding of the outer wall. Further, a separable dividing portion is formed between the top end portion and a base end portion of the outer wall. Accordingly, a pipe body itself has a structure to keep a straight posture normally by means of windings of the outer wall coupled with each other. On the other hand, in a portion requiring bent plumbing when this pipe is subjected to plumbing, a coupling portion of the top end portion of the outer wall is detached and the dividing portion 43 is cut and divided to cut the top end portion, and then the top end portion is removed in the form of cord so as to release a winding of the outer wall from being coupled with another winding of the outer wall.

Since this pipe body has a flexible inner wall, if coupling of the top end portion of the outer wall is released thus, the pipe body can be bent within the region where this coupling is released. Therefore, if the region where this coupling of the top end portion is released is established desirably, it is possible to perform bent plumbing at a desired angle in a desired place.

BRIEF DESCRIPTION OF THE DRAWINGS

FIG. 1 is a sectional view of a pipe wall portion illustrating a first embodiment, FIG. 2 is a partially exploded sectional view of the pipe wall portion of FIG. 1, FIG. 6 is an explanatory diagram of a coupling means with a plug-in type pipe joint.

FIG. 7 is an explanatory diagram of a coupling means with a socket type pipe joint.

DETAILED DESCRIPTION OF THE INVENTION

Figure 3:
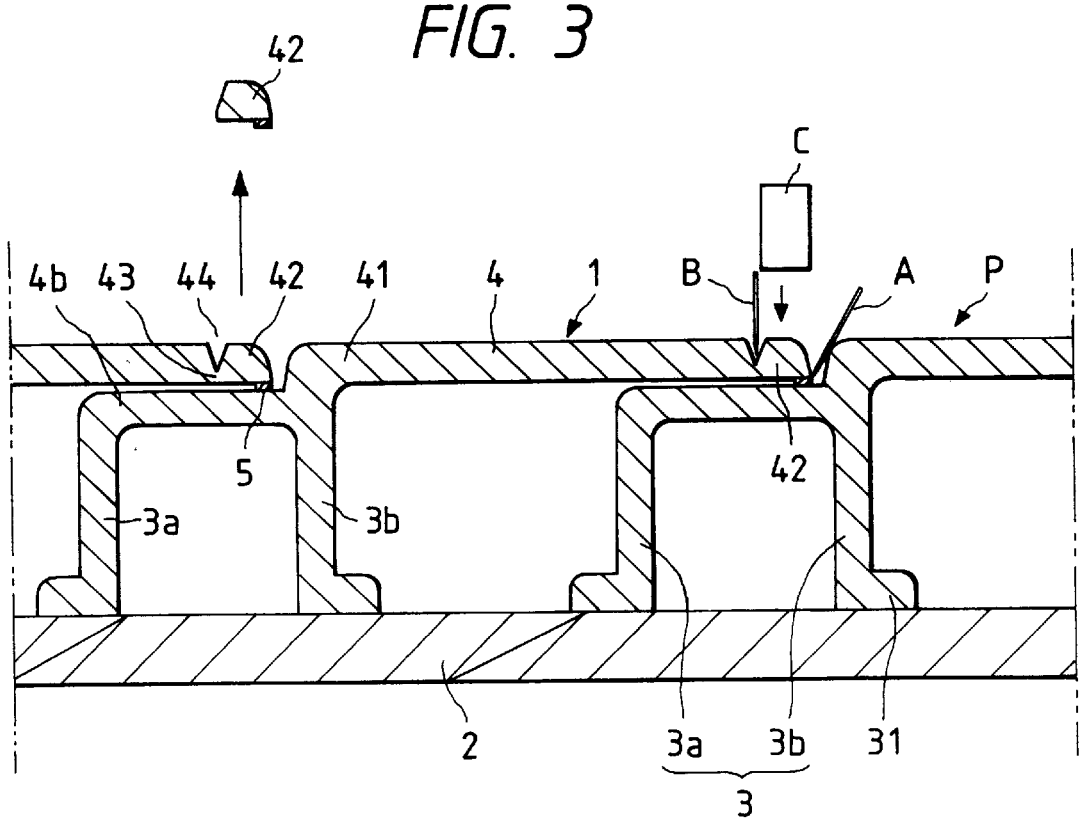
FIG. 3 is an explanatory diagram for release of a coupling portion of the pipe wall of FIG. 1.
Figure 4:
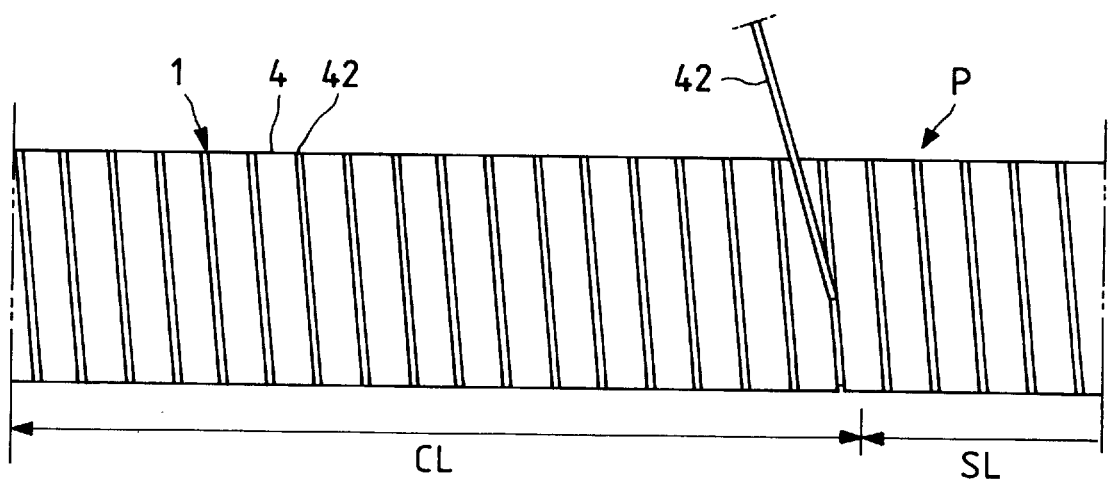
FIG. 4 is a side view of a straight pipe posture of a pipe body.
Figure 5:
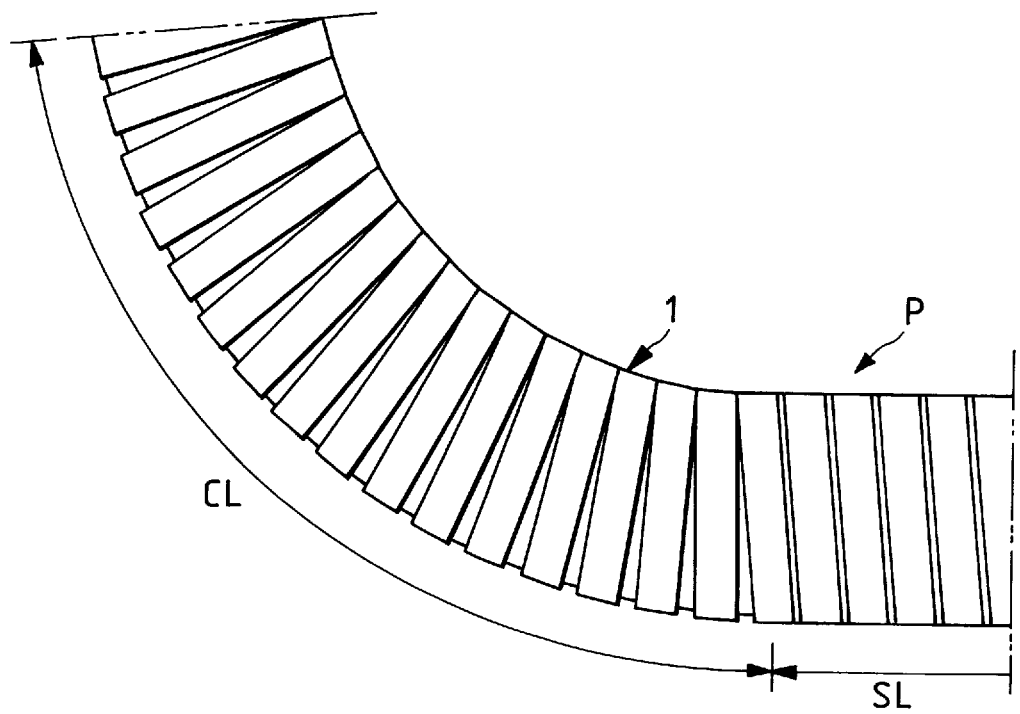
FIG. 5 is a side view of a bent posture of the pipe body.

Next, preferred embodiments of the present invention will be described with reference to the accompanying drawings. FIGS. 1 to 5 are diagrams illustrating a first embodiment of the present invention. FIG. 1 is an expanded sectional view illustrating the structure of a pipe wall 1 of a synthetic resin pipe; FIG. 2 is an exploded sectional view illustrating the pipe wall 1 shown in FIG. 1; FIG. 3 is a sectional view of the pipe wall 1 shown in FIG. 1 for explaining a separating means of a top end portion 42 of an outer wall 4; FIG. 4 is an exterior view of the straight posture of a pipe body P; and FIG. 5 is an exterior view of the bent posture of the pipe body P.

Describing the structure of a synthetic resin pipe body P shown in this embodiment, as shown in FIGS. 1 to 3, a pipe wall 1 has an inner wall 2 formed of a soft material of polyvinyl chloride (PVC) resin into a cylindrical shape, two rising ribs 3a and 3b respectively having base portions 31 bonded on the outer circumferential surface of the inner wall 2 and extended in the outer circumferential direction, an outer wall 4b coupling the rising ribs 3a and 3b in the pipe axial direction at a predetermined distance from the inner wall 2 in the circumferential direction, and an outer wall 4a having a base end portion 41 coupled with the rising rib 3b integrally and extended in the pipe axial direction. The two rising ribs 3a and 3b and the two outer wall 4a and 4b are formed of a hard material of polyvinyl chloride (PVC) resin integrally. In addition, these ribs 3a and 3b and outer walls 4a and 4b are spirally wound. A top end portion 42 of the outer wall 4a extended in the pipe axial direction is bonded and coupled with a bonding agent 5 onto the outer circumferential surface of the outer wall 4b connecting the ribs 3a and 3b so that only a part of the top end portion 42 almost contacts with the side of the base end of the outer wall 4a extended in the pipe axial direction of a preceding winding of the outer wall 4. In a portion near this top end portion 42 but separated by a little distant from the portion where the top end portion 42 is bonded by the bonding agent 5, a notched groove 44 cut into a V-shape (this shape may be an I-shape or any other shape) is formed in the outer circumferential surface of the outer wall 4a, and the rest portion divided by the notched groove 44 is formed into a dividing portion 43 which can be separated. This dividing portion 43 may be formed as a perforated line, a partially notched line, or the like.

When the pipe body P having such a structure is manufactured, as shown in FIG. 2, on the circumferential surface of a pipe forming shaft which is not shown, a belt material 20 formed by extruding a soft PVC material into a flat belt is first wound spirally (the arrow b) so that their side edge portions are laid to overlap each other, the overlapped portions are welded or bonded by a bonding agent with each other so as to form an inner wall 2 which is approximately cylindrical. On the other hand, a belt material 40 having two rising ribs 3a and 3b, a side wall (outer wall) 4b connecting the top portions of these ribs, a side wall (outer wall) 4a extended in the side outside from the top end portion of the rising rib 3b, and a notched groove 44 cut into a V-shape in the outer circumferential surface near the outer end portion (top end portion) 42 of this side wall 4a, is formed by extruding a hard PVC material. This is wound spirally on the outer circumferential surface of the inner wall 2 as shown in the downward arrow a. Base portions 31 and 31 of the two ribs 3a and 3b are bonded with the inner wall 2 by welding (or a bonding agent) respectively while a part of the outer end portion 42 of the side wall 4a is bonded onto the side wall 4b connecting the ribs 3a and 3b by a bonding agent 5. When the ribs 3a and 3b are bonded with the inner wall 2 by welding, it is possible to weld them more accurately if both the base portions 31 and 31 of the ribs 3a and 3b are formed by extruding soft PVC resin.

Although the bonding agent 5 illustrated in FIG. 2 is bonded to the belt material 40 in advance, not to say, the bonding agent 5 may be applied on the side wall 4b connecting ribs 3a and 3b. The bonding agent 5 may be applied onto the both, or, alternatively, it is possible to use any other desired means such as a method of plastering a bonding sheet without using a bonding agent, a method of welding, a method of heating-fusing the surfaces to be bonded, or the like.

Since windings of the outer wall 4 are bonded and coupled by the bonding agent 5, the pipe body P manufactured thus has a structure to keep a straight posture normally. However, in the case where a bent portion needs to be formed when the pipe body P is subjected to plumbing, that is, in the case where bent plumbing is required, as shown in FIG. 3, in a required portion, the bonding agent 5 of the outer wall to end portion 42 is peeled with a sharp edged tool or the like (A). A thin portion 43 at the bottom of the notched groove 44 is cut and separated by putting an edged tool or the like into the groove 44 (B), and next the top end portion 42 is cut by putting an edged tool or the like perpendicularly (in a pipe axial direction) to the top end portion 42 (C). Any of the steps (A) to (C) may be performed first. The top end portion 42 is raised after these steps as shown in the left of FIG. 3, and this portion is picked up. Then the top end portion 42 is folded and removed in the form of cord sequentially as shown in FIG. 4. In this manner, the coupling between adjacent windings of the outer wall 4 is released over a required length along the pipe body P.

If the coupling of the top end portion 42 of the outer wall 4 is released thus, since the inner wall 2 of this pipe body P is formed of a flexible material, the pipe wall 1 can be bent in the region where the coupling is released, as shown in FIG. 5. In this manner, the region where the coupling of the top end portion 42 of the outer wall 4 is released is established desirably, so that bent plumbing can be performed at a desired angle in a desired portion.

In the pipe body (synthetic resin pipe) P shown in this embodiment, the inner wall 2 is made approximately cylindrical, and the outer wall 4 is also made approximately cylindrical, so that when the pipe body P is connected with a plug-in type pipe joint 6A as shown in FIG. 6, it goes well if a bonding agent is applied onto the surface of a plug-in cylinder 61 of the pipe joint 6A, and the pipe body is pushed to contact with a flange portion 62. When the pipe body P is connected with a socket type pipe joint 6B as shown in FIG. 7, it goes well if a bonding agent is applied onto the outer circumferential surface of an end portion of the pipe wall 1, and the pipe body P is inserted into a cylindrical portion 63 of the pipe joint 6B. In such a manner, it is possible to couple the pipe body P with a pipe joint easily.

Figure 8:
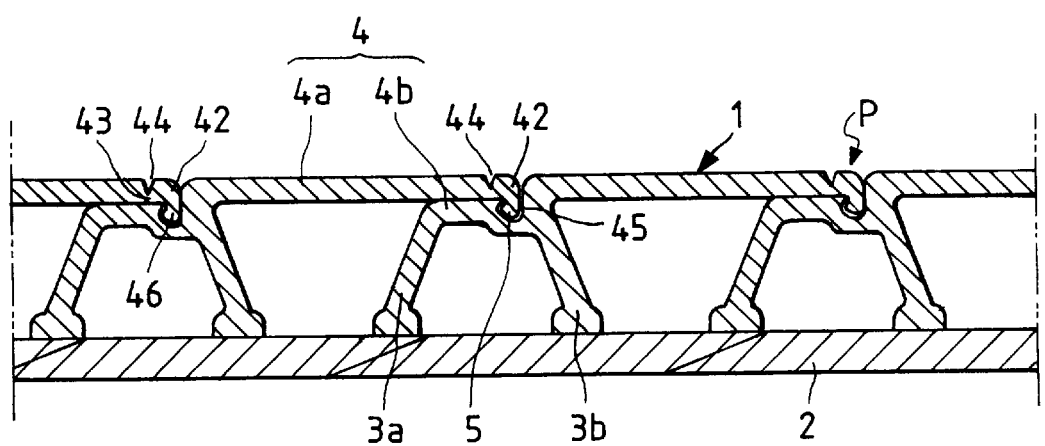
FIG. 8 is a sectional view of a pipe wall portion illustrating a second embodiment.

A pipe body P shown in FIG. 8 is a pipe as a second embodiment, in which windings of an outer wall 4 are coupled by fitting without using a bonding agent as coupling means of the outer wall 4. In a coupling portion 5 in this embodiment, a fitting groove 45 is formed at an end of an outer wall 4b connecting ribs 3a and 3b to open toward the outer circumferential surface while a fitting projection 46 is formed to project in the lower portion of a top end portion 42 of an outer wall 4a projecting in the pipe axial direction. This fitting projection 46 is pushed and fitted into the fitting groove 45. The ribs 3a and 3b in this embodiment has a shape to be raised and inclined to be widened toward the end. To release this coupling by fitting, as described in the first embodiment, a thin portion 43 is cut from a notched groove 44, and the top end portion 42 is picked up together with the fitting projection 46.

Figure 9:
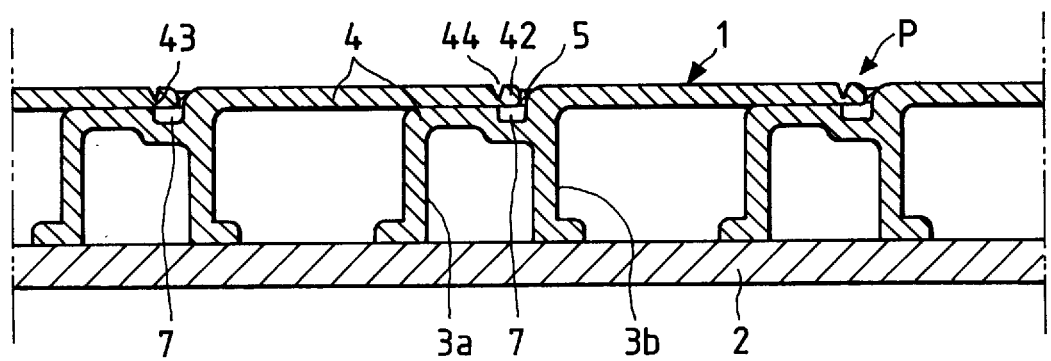
FIG. 9 is a sectional view of a pipe wall portion illustrating a third embodiment.

Synthetic resin pipes P shown in FIG. 9 et seq. shows other embodiments respectively. The inner wall 2 in the present invention may be formed by extruding into a pipe other than by winding a belt-like material as shown in the first embodiment. Therefore, oblique lines indicating connection portions of a belt-like material is not shown in the inner wall 2 in FIG. 9 et seq. In a pipe body P of a third embodiment shown in FIG. 9, windings of an outer wall 4 are coupled with each other by bonding with a bonding agent 5 between a top end surface of a top end portion 42 of an outer wall 4 projecting in the pipe axial direction and a rear end surface of a preceding winding of the same outer wall 4. In addition, a hollow portion 7 is formed in the lower side of the top end portion 42. Therefore, in the pipe body P in this embodiment, the coupling of winding of the outer wall 4 may be released by such an operation that the top end portion 42 is pushed into the hollow portion 7 as the portion of a bonding agent 5 and a thin portion 43 under a groove 44 are separated and cut by an edged tool (not shown) having an inverted-U shape. Not to say, this top end portion 42 may be peeled toward the outside as described in the first embodiment.

Figure 10:
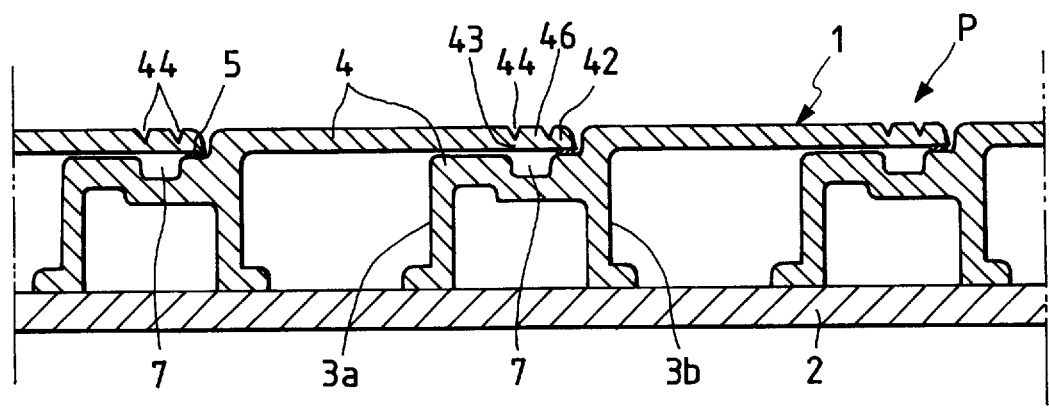
FIG. 10 is a sectional view of a pipe wall portion illustrating a fourth embodiment.

A pipe body 10 of a fourth embodiment shown in FIG. 10 has a difference from the pipe shown in the first embodiment as follows. That is, another notched groove 44 is formed along one notched groove 44 formed in a top end portion 42 of an outer wall 4, and hollow portion 7 is formed under these two notched grooves 44 and 44. Since this pipe body P has such a structure, in the same manner as in the embodiment of FIG. 9, the connection of windings of the outer wall 4 is released by cutting the two grooves 44 by an inverted-U edged tool, and pushing an outer wall 46 between the grooves 44 and 44 into the hollow portion 7, or peeling it toward the outside.

A pipe body P of a fifth embodiment shown in FIG. 11 has a difference from the pipe shown in the first embodiment as follows. That is, a side wall 3c is formed in the lower side (on the inner wall 2 side) of two rising ribs 3a and 3b so as to connect these two ribs 3a and 3b, and the other end side (on the left side in the drawing( of an outer wall 4b connecting the upper ends of these ribs 3a and 3b is extended horizontally so as to provide an outer wall 4c projecting horizontally. When the rising ribs 3a and 3b are made to be in form of a hollow rectangular belt having connection walls on the upper and lower sides respectively, the ribs 3a and 3b have strength, and their surfaces to be connected to the inner wall 2 can be made large. In addition, when the outer wall 4c projecting horizontally is formed, even if the pipe body P is bent more or less in a sharp curve in a bent plumbing portion, there is an advantage that it is certainly possible to prevent the inner wall 2 having less strength from being exposed by putting off overlaid portions of the outer wall 4.

Figure 11:
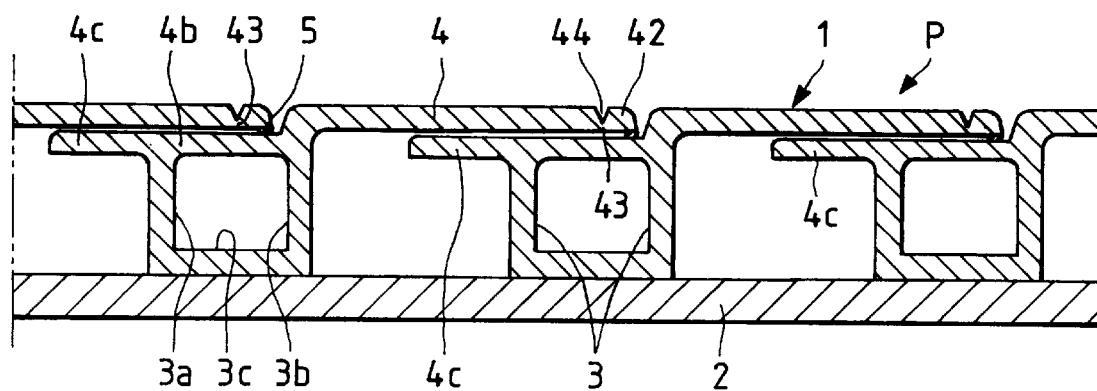
FIG. 11 is a sectional view of a pipe wall portion illustrating a fifth embodiment.
Figure 12:
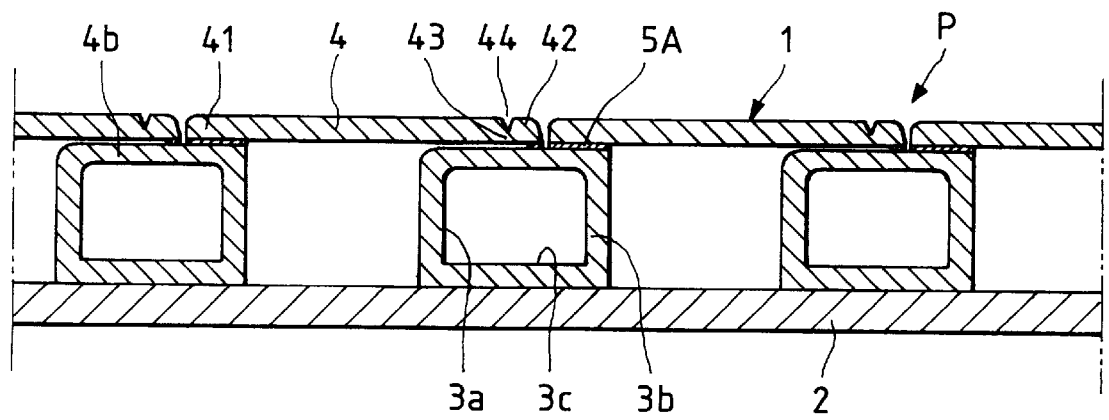
FIG. 12 is a sectional view of a pipe wall portion illustrating a sixth embodiment.

In a pipe body P of a sixth embodiment shown in FIG. 12, a rib 3 and an outer wall 4 are formed by a square hard body formed by a side wall 3c connecting the lower sides (on the inner wall 2 side) of two ribs 3a and 3b, and an outer wall 4b connecting top ends of the two ribs 3a and 3b, and a hard outer wall 4 formed into a flat belt separately from the square hard body in the same manner as in the embodiment of FIG. 11. A base end portion 41 of the hard outer wall 4 is connected onto the outer wall 4b connecting the ribs 3a and 3b by a bonding agent 5A or other means. It is not always necessary to form the rib 3 and the outer wall 4 integrally as shown in the embodiments in and before FIG. 11, but they may be formed separately and connected as shown in this embodiment.

Although a rising rib 3 in the present invention can be made stable with respect to an inner wall 2 if the rib 3 is constituted by two ribs provided in parallel as shown in the respective embodiments, the number of ribs is not limited to two, but it may be one, three or more. In addition, means for forming a thin portion 43 of an outer wall is not limited to the means for forming the thin portion 43 by a V- or I-shaped notched groove 44 cut in the outer circumferential surface, but it may be a method of cutting in the inner and outer surfaces, or any other desired means so long as separation can be performed thereat easily.

In addition, preferably, a material superior in abrasion resistance, a material superior in chemical resistance, or the like is used selectively as the resin material forming the inner wall 2 of a pipe in accordance with the kind and characteristic of substances flown in the pipe. Preferably, materials superior in water resistance, weather resistance and so on are used selectively as the resin material forming the outer wall 4.

Although the typical embodiments of the present invention have been described above, the present invention is not always limited to only the structures of those embodiments, but it may be modified and carried out desirably within the scope where the above-mentioned constituent requirements stated in the present invention are provided, the objects of the present invention can be attained, and the following effects can be obtained. For example, as the material form forming the rib 3 and the outer wall 4, a pair of belt like materials which are the same in shape or which are different from each other in shape and pipe axial length may be used so as to obtain a pipe in which each of the rib 3 and the outer wall 4 is wound in a double-pitched shape. Alternatively, it is possible to obtain a pipe body in which the outer wall 4 is made to have an uneven, concave and convex, spiral shape, or so.

As described above, in the present invention, the structure of the pipe wall is made such that it has an inner wall 2 cylindrically formed of a soft material of rubber, synthetic rubber or synthetic resin, a rising rib bonded at its base portion onto an outer circumferential surface of the inner wall so as to extend therefrom in an outer circumferential direction, and an outer wall coupled at its base end portion with the rising rib so as to extend in an axial direction of the pipe in a position separated at a predetermined distance circumferentially from the inner wall, the rib and the outer wall being formed of a hard synthetic resin material and wound spirally, wherein only a top end portion of the outer wall is coupled with a preceding winding of the outer wall, and a separable dividing portion is formed between the top end portion and the base end portion. Accordingly, the pipe body itself has a structure to keep a straight posture normally by means of the outer wall the windings of which are coupled with each other. Therefore, there appears no phenomenon of sagging even if the pipe body is subjected to plumbing horizontally or with an inclination, and the pipe can be subjected to plumbing in a desirable and required posture in the same manner as in the case of an ordinary straight pipe.

In spite of such a pipe, in a portion where bent plumbing is required when the pipe is subjected to plumbing, the restriction of the flexibility of the inner wall can be released by cutting and separating the division portion of the outer wall to release the windings of the outer wall from being connected with each other, so that the pipe body can be bent within the region where this coupling of the windings of the outer wall is released. Therefore, it is possible to change the pipe body from a straight pipe state to a flexible pipe state in a desired portion of the pipe body, so that in spite of a straight pipe, there is a conspicuous effect that bent plumbing can be performed in a required and desired portion at a desired angle in the state of a seamless continuous pipe, without cutting or requiring any bent joints such as elbows for bent plumbing.

What is claimed is:

1. A resin pipe, comprising:

a soft, spirally wound cylindrical inner wall; and a hard, spirally wound cylindrical outer wall including;
   at least one rib having a base portion connected to said inner wall and a top portion opposite said base; and
   an outer portion connected to said top portion of said rib, said outer portion of said outer wall extending in an axial direction of said pipe such that said outer portion of said outer wall is separated in a circumferential direction from said inner wall, said outer portion of said outer wall including a first end adjacent said rib, a second end opposite said first end, said second end being connected to said first end of a preceding winding of said outer wall, and a separable dividing portion positioned on said outer portion of said outer wall between said first end and said second end.

2. A resin pipe according to claim 1, wherein said inner wall and said outer wall comprise approximately flat cylinders.

3. A resin pipe according to claim 1, wherein said rib and said outer portion of said outer wall comprise a single, integral structure.

4. A resin pipe according to claim 1, wherein said rib and said outer portion of said outer wall comprise separate connected structures.

5. A resin pipe according to claim 4, wherein said rib includes a first rib, a second rib parallel to said first rib, a base wall connecting said base portion of said first and second ribs and a top wall connecting said top portion of said first and second ribs.

6. A resin pipe according to claim 1, wherein said second end of said outer portion of said outer wall is mechanically connected to said first end of said preceding winding of said outer wall.

7. A resin pipe according to claim 1, wherein said at least one rib includes a first rib and a second rib parallel to said first rib, wherein said outer portion of said outer wall includes a hollow portion between said first rib and said second rib.

8. A resin pipe according to claim 7, wherein said separable dividing portion includes a first dividing portion and a second dividing portion for being positioned over said hollow portion of said preceding winding.

9. A resin pipe according to claim 1, wherein said at least one rib includes a first rib, a second rib parallel to said first rib, a base wall connecting said base portion of said first and second ribs and a top wall connecting said top portion of said first and second ribs, said outer portion of said outer wall being connected to said top wall.

10. A resin pipe according to claim 1, wherein said second end of said outer portion of said outer wall is bonded to said first end of said preceding winding of said outer wall.

11. A resin pipe according to claim 1, wherein said inner wall comprises one of rubber, synthetic rubber and synthetic resin, and has an outer circumferential surface,
   said outer wall comprising a synthetic resin material, and
   said rib comprising a rising rib including a hard synthetic resin material and being bonded to said outer circumferential surface of said inner wall.

12. A resin pipe according to claim 1, wherein said outer portion of said outer wall includes a notched groove adjacent said dividing portion.

13. A resin pipe according to claim 1, wherein, when said dividing portion is severed, said first end of said outer portion is separated from said second end of said outer portion.

14. A resin pipe according to claim 1, wherein said pipe is flexible at a position where said dividing portion is severed and said pipe is rigid at a position where said dividing portion is in place.

* * * * *